United States Patent [19]

Sampsell

[11] Patent Number: 5,459,602
[45] Date of Patent: Oct. 17, 1995

[54] MICRO-MECHANICAL OPTICAL SHUTTER

[75] Inventor: Jeffrey B. Sampsell, Plano, Tex.

[73] Assignee: Texas Instruments, Dallas, Tex.

[21] Appl. No.: 148,073

[22] Filed: Oct. 29, 1993

[51] Int. Cl.[6] ........................... G02B 26/02; G02B 27/46; H01L 41/08
[52] U.S. Cl. .................. 359/234; 359/230; 359/559; 359/561; 310/42; 310/90.5; 216/24; 216/39
[58] Field of Search ...................... 359/227, 230, 359/233, 234, 236, 559, 561; 310/40 R, 42, 90, 90.5, 268, 309; 250/232, 233; 156/651, 652

[56] References Cited

U.S. PATENT DOCUMENTS

| | | | |
|---|---|---|---|
| 4,740,410 | 4/1988 | Muller et al. | 428/133 |
| 4,943,750 | 7/1990 | Howe et al. | 310/42 |
| 5,252,881 | 10/1993 | Muller et al. | 310/309 |
| 5,327,286 | 7/1994 | Sampsell et al. | 359/561 |

*Primary Examiner*—Paul M. Dzierzynski
*Assistant Examiner*—James Phan
*Attorney, Agent, or Firm*—Julie L. Reed; Richard L. Donaldson; Rene E. Grossman

[57] ABSTRACT

A micro-optical shutter array (92, 102) having a number of tiny shutters (10), which revolve so as to intermittently block light from a via (12), and which may be operated in either a stepping or continuous motion. The array (92, 102) may be batch manufactured using integrated circuit fabrication techniques. For each shutter, a via (12) is etched through a substrate (11). A rotor (13, 43, 53, 63) with at least one opening is fabricated over the via (12), such that as the rotor (13, 43, 53, 63) turns, radiation transmitted through the via (12) is selectively blocked or not blocked.

18 Claims, 5 Drawing Sheets

5,459,602

MICRO-MECHANICAL OPTICAL SHUTTER

TECHNICAL FIELD OF THE INVENTION

This invention relates to micro-optical devices, and more particularly, to an optical shutter whose motion is provided by a micromotor.

BACKGROUND OF THE INVENTION

A recent development in the field of optical instrumentation has been the miniaturization of various optical devices. These "micro-optical" devices use tiny optical components for applications such as lightwave communications and optical computing. An example of a micro-optical device is a microlens array, which can be fabricated using integrated circuit fabrication techniques. Various guided wave devices, such as planar waveguides are also being made on a micro-optical scale. A need exists for an optical switch that is compatible with these micro-optical devices.

SUMMARY OF THE INVENTION

A first aspect of the invention is an array of micro-optical shutters, each for intermittently blocking the passage of radiation. A substrate has a plurality of vias through which said radiation may pass. Each via is associated with a shutter. Each shutter comprises a rotor hub fabricated on the substrate and a rotor spaced above the substrate for revolving around the rotor hub in a plane parallel to the substrate, The rotor has at least one opening that is aligned with the via during a part of each revolution of the rotor. A set of stator poles is also fabricated above the substrate around the perimeter of the rotor and substantially co-planar to the rotor. A voltage applied to the stator poles provides a rotor torque that causes the rotor to rotate. A control unit controls the timing of the voltage applied to the stator poles.

A technical advantage of the shutter array is that each shutter permits a very small beam of light to be chopped or switched. The shutters can be operated at very high speeds, either in continuous or stepped motion. Shutters having continuous motion are useful as infrared choppers. Shutters having stepped motion are useful for optical switching. Arrays of shutters can be easily manufactured, each shutter having uniformity of size and of other characteristics. The arrays are especially suited for various applications involving other micro-optical or micro-electrical components, such as optical fibers, lens, and light modulators.

DETAILED DESCRIPTION OF THE INVENTION

Figure 1:
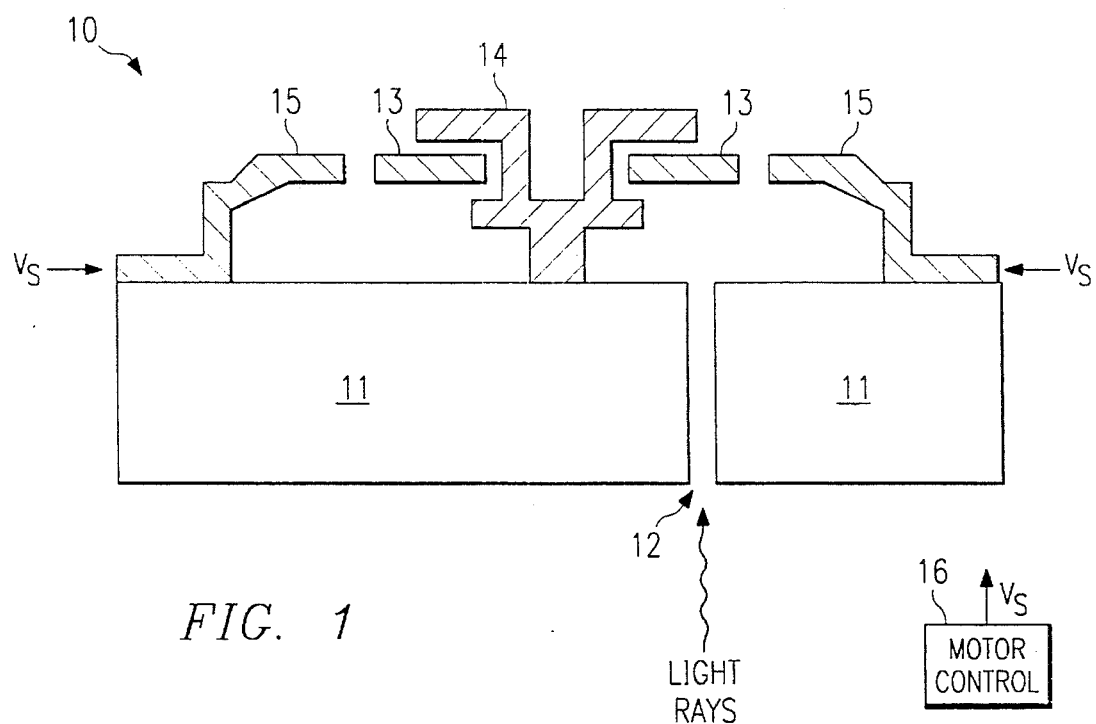
FIGS. 1 and 2 are cross sectional and plan views, respectively, of an optical shutter.
Figure 2:
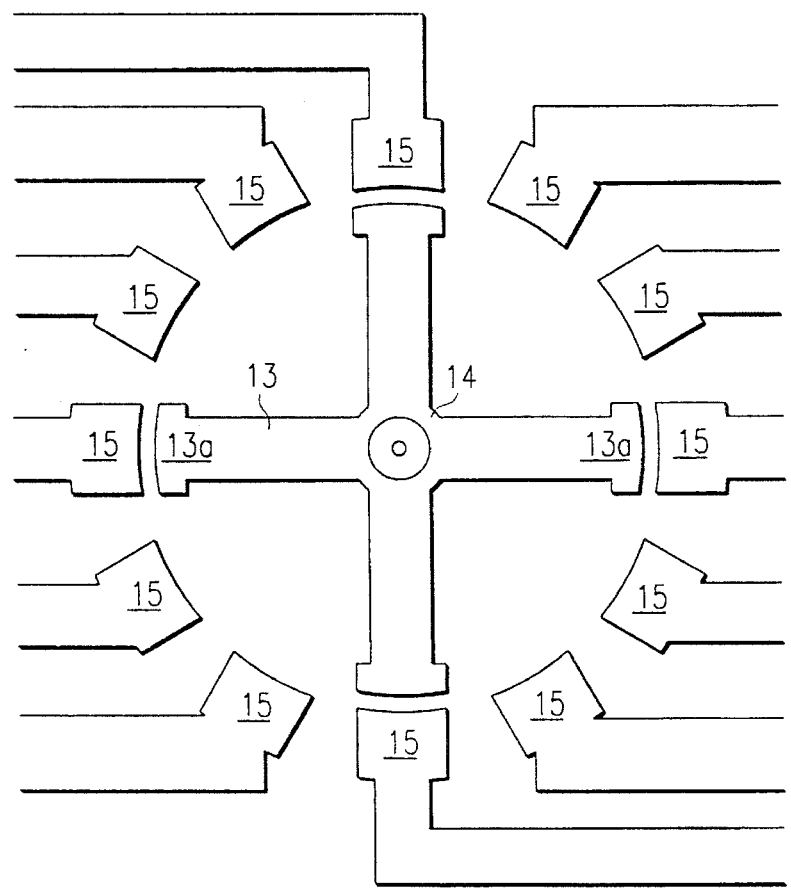

FIGS. 1 and 2 are a cross sectional view and a plan view, respectively, of an optical shutter 10 in accordance with the invention. Shutter 10 is a "micro-mechanical" device, having dimensions in the order of 100 microns in diameter and thickness.

Shutter 10 is fabricated on a substrate 11, using semiconductor fabrication techniques, discussed in further detail below. The use of these fabrication techniques permits batch fabrication of many such shutters 10 on a single substrate 11. After fabrication, the shutters may be separated into multi-element arrays, or may be separated into single units.

Typically, substrate 11 is silicon, but may be any material that permits a via 12 to be etched through it. Other suitable materials for substrate 11 are quartz or forms of aluminum oxide. The requirements for the material are that it survive the fabrication process, have sufficient adhesion to the layers deposited over it so as to permit etching, and have etching selectivity with respect to sacrificial materials used during the fabrication process.

Via 12 extends through substrate 11. As explained below, via 12 permits light from a source to pass upwardly through substrate 11, from bottom to top, where it is intermittently blocked by a rotating rotor 13. Typically, as shown in FIG. 2, via 12 is cylindrical in shape.

For a shutter 10 having a diameter in the order of 100 microns, via 12 might have a diameter ranging from 2 microns to 50 microns. A feature of the invention is that via 12 may be sized so that it securely holds an optical fiber.

In the embodiments of this description, shutter 10 has one via 12 for providing a single point source of light. However, shutter 10 may have more than one via 12.

Shutter 10 has a rotor 13, which is free to rotate around a hub 14. In FIG. 2, rotor 13 has four equidistant spokes 13a radially extending from an inner ring. As explained below, other rotor shapes may be used consistent with known techniques for turning a rotor 13 by applying voltage to a set of stator poles 15 around the outer perimeter of the rotor 13. Spokes 13a are rotor poles, spaced ninety degrees apart. When a voltage is applied to a stator pole 15, an electrostatic attractive develops between that stator pole 15 and the nearest rotor pole 13a. Timing of the applied voltage to successive stator poles 15 causes a rotor torque on successive rotor poles 13a. Consistent with this principle of operation, rotor poles 13a and stator poles 15 are made from a polarizable material, typically silicon.

Stator poles 15 surround the outer circumference of rotor 13. Each stator pole 15 is connected to a conductive lead (not shown), which permits a voltage to be applied to each stator pole 15.

As shown in FIG. 1, motor control unit 16 controls the timing of the applied voltage. Control unit 16 may be fabricated on-chip or may be an off-chip component.

The combination of rotor 13, hub 14, and stators 15 comprise a "micro-motor", whose manufacture is known in the art of micro-mechanics. An example of a micro-motor suitable for use with the present invention and a method of manufacture are described in U.S. Pat. No. 5,252,881, entitled "Micro Motors and Method for Their Fabrication", which is incorporated by reference herein. As described therein, the rotation of rotor 13 may be continuous or stepped. U.S. Pat. No. 4,740,410, entitled "Micromechanical Elements and Methods for Their Fabrication", also describes the operation and manufacture of micromotors, and is also incorporated by reference herein.

Figure 3A:
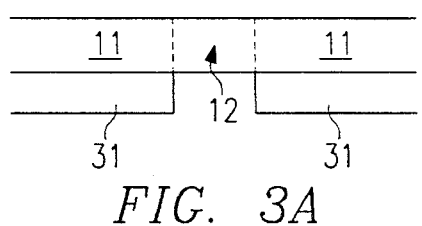
FIGS. 3A–3C illustrates the steps of making a via during fabrication of a micromotor.
Figure 3B:
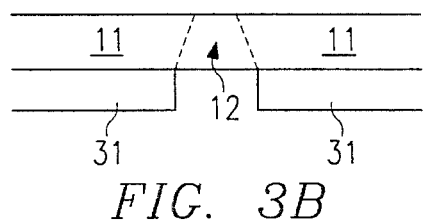
Figure 3C:
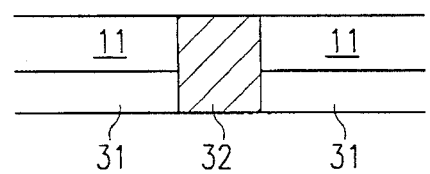

FIGS. 3A–3C illustrate how known processes for manufacturing a micromotor can be modified to include the opening of via 12 in substrate 11. At an early phase of manufacture, prior to deposition of the layers from which rotor 13, hub 14, and stators 15 are fabricated, a masking layer 31 is patterned on either side of substrate 11. In FIGS. 3A–3C, this step has been performed on the underside of substrate 11. As indicated by the dashed lines, etching is performed on the patterned side, to etch out via 12. In FIG. 3A, the etching results in a cylindrical shaped via 12, especially suitable when via 12 is to hold an optical fiber.

FIG. 3B illustrates a variation of the etching process, which is especially suitable when shutter 10 will be used with a light source other than an optical fiber inserted in via 12. In the process of FIG. 3B, the etching is a process known as orientation directed etching (ODE). As an example of this process, substrate 11 is a material known as 1,1,1 silicon. The mask 31 is patterned so that the edges that define via 12 are calculated to result in a via having a desired depth. The ODE etches along the single crystal silicon planes. As indicated by the dotted lines, the etch results in a cone-shaped via 12. Then, as explained below in connection with FIG. 9, a lens directing light toward the underside of shutter 10 may be used to focus light to the "far" opening of via 12.

As shown in FIG. 3C, upon completion of the etching, via 12 is plugged with a spacer material 32 that will subsequently be removed. For example, via 12 may be plugged by depositing a layer of phosphate glass, silicon nitride, or amorphous silicon. The masking material 31 may be removed at this time or during some subsequent clean-up phase.

After via 12 is etched and plugged, the layers for the rotor 13, hub 14, and stator 15 are deposited on the top side of substrate 11. Fabrication of these various components is at appropriate locations with respect to via 12. Consistent with known micro-motor fabrication techniques, sublayers of substrate 11 may be deposited for purposes such as strengthening or grounding. Upon completion of rotor 13, hub 14, and stators 15, an etching step removes the spacer material that fills via 12.

As an alternative to the process of FIGS. 3A–3C, it may be possible to etch and plug via 12 at later stages of manufacture, i.e., as rotor 13 and stators 15 are being formed. In this case, via 12 would be etched from the underside of substrate 11. Appropriate sacrificial material would be deposited over and between rotor 13 and stators 15 for protection during the etching of via 12.

Referring again to FIG. 2, rotor 13 is especially suitable for continuous rotation. Such continuous rotation is useful when shutter 10 is to be operated as a light "chopper" for example, with an infra-red sensor. As an example of how rotor 13 is caused to rotate continuously, stator poles 15 may be connected for three-phase operation. Adjacent stator poles 15 are designated as phase one, phase two, and phase three poles. For the twelve stator poles 15 of FIG. 2, there are four poles 15 for each phase. The stator poles 15 are connected to a control unit 16 and a voltage applied in successive phases. As each phase rises to its maximum voltage, the stator poles 15 create a force on each rotor arm 13a. The result is a rotor torque, which causes rotor 13 to turn.

Figure 4:
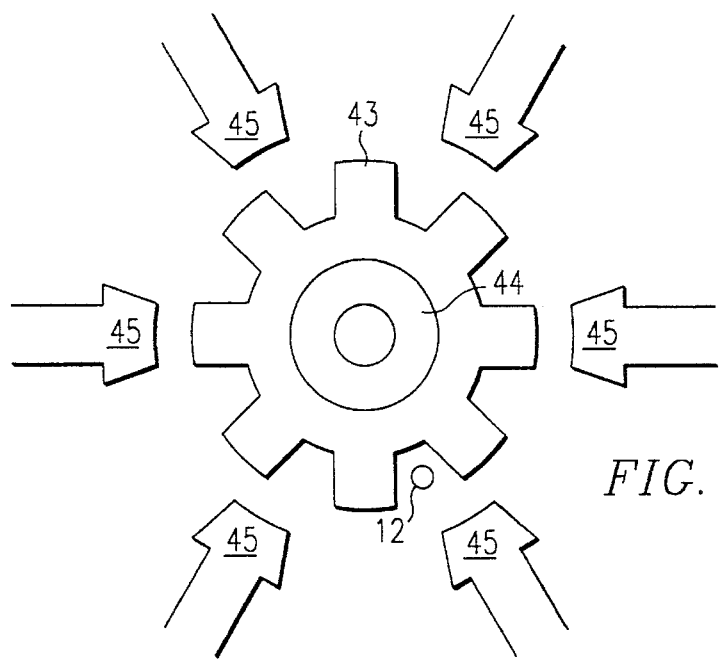
FIG. 4 is an alternative design for the rotor and stator poles.

FIG. 4 illustrates an alternative rotor 43 and stator poles 45, especially suitable for stepping, as opposed to continuous rotation. Stepping motion is used when shutter 10 is operated as an optical switch. Like rotor 13, rotor 43 has arms, which are located with respect to via 12 so as to intermittently block light as rotor 43 turns. In this configuration, there are eight rotor poles 43a and six stator poles 45. The applied voltage is applied successively to opposing stator poles 45. As stepping of the voltage from stator poles 45 to a next stator pole 45 occurs, the rotor 43 revolves in a stepped motion around hub 44. For a stepped motor, a DC bias may be applied between the rotor 43 and the substrate 11 when rotor 43 is in a light-blocking phase of its motion, so as to seat rotor 43 against substrate 11.

Figure 5:
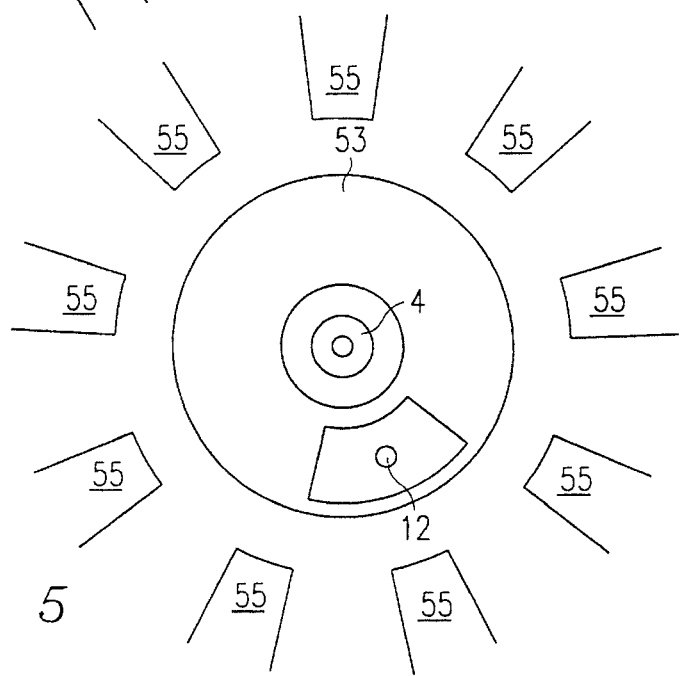
FIG. 5 is a third alternative design for the rotor.

FIG. 5 illustrates a third type of rotor 53, which is known as a "wobble" rotor. Rotor 53 is designed for continuous motion, but may be disk-shaped, as opposed to having rotor arms. Rotor 53 turns around a hub 54, due to torque from applied voltage to stator poles 55. However, the rotation of rotor 53 is eccentric with respect to hub 54. An opening in rotor 53 has been etched to permit light from via 12 to pass past rotor 53 as it rotates.

FIGS. 2, 4 and 5 illustrate that for both continuous and stepper operation, various rotor geometries may be used. Techniques known in the art of micro-motors may be used for various rotor designs optimized for speed, smoothness of motion, torque, and other motor characteristics.

Figure 6:
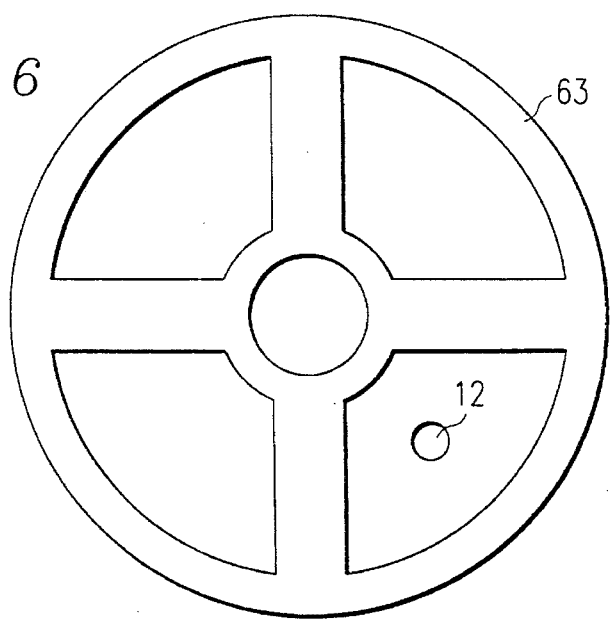
FIG. 6 illustrates how the rotor geometry determines the duty cycle of blocked versus non-blocked light.

FIG. 6 illustrates how the rotor geometry is related to a desired duty cycle of blocked versus non-blocked light, regardless of whether the rotor is disk-shaped or spoked. Rotor 63 has spokes like the rotors of FIGS. 2 and 4, but the addition of an outer rim makes it similar to the "wobble" rotor of FIG. 5. Like the opening in the rotor of FIG. 5, the openings between spokes determine when rotor 63 will block light from via 12 as it revolves. Thus, a common characteristic of the various rotor designs is that each rotor has at least one opening that permits light from via 12 to pass during part of each revolution.

FIGS. 2, 4, and 5 further illustrate that by having a plurality of openings in the rotor, the frequency of blocked versus non-blocked light can be increased without increasing the speed of rotation. In FIG. 2, where rotor 13 has four openings, for each revolution, light from via 12 is switched from off to on four times.

Figure 7:
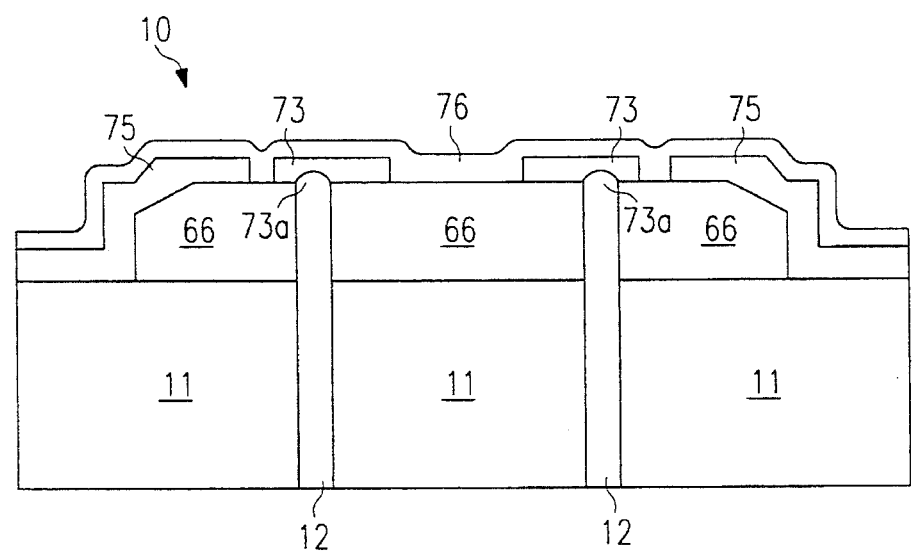
FIG. 7 illustrates a rotor having dished-out portions of its underside for improving the shutter's light blocking capability.

FIG. 7 illustrates how the fabrication process may be modified to enhance the light blocking capability of shutter 10. Instead of a single via 12, a number of vias 12 are etched. These vias 12 are etched after rotor 73 and stators 75 are formed. A layer of sacrificial material 76 has been deposited over rotor 73 and stators 75. As vias 12 are being etched through spacer layer 66, dished out portions 73a on the underside of rotor 73 are also etched. If desired, these dished out portions 73a can be metallized, such as by sputtering. The spacer material is then deposited to plug vias 12. The rest of the fabrication is performed as explained above, with at least one via 12 being unplugged during a final etch. The result is a reflective surface when the rotor 13 blocks light from that via 12.

Figure 8A:
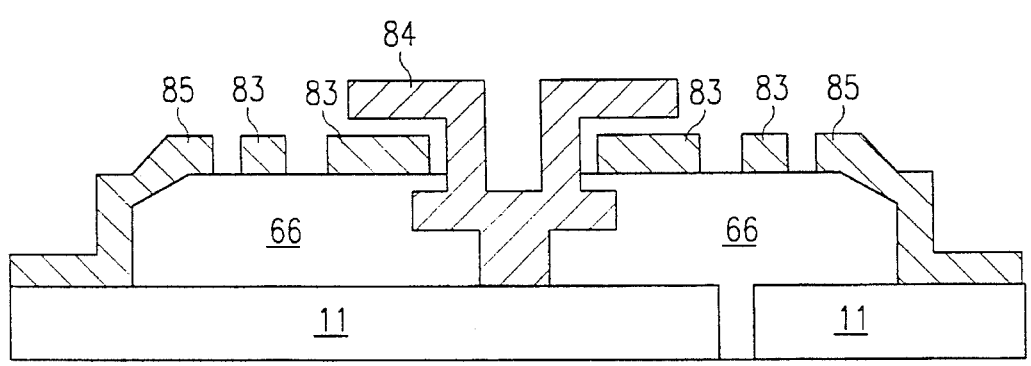
FIGS. 8A–8E illustrate how the fabrication process may be modified to add a filter over the via.
Figure 8B:
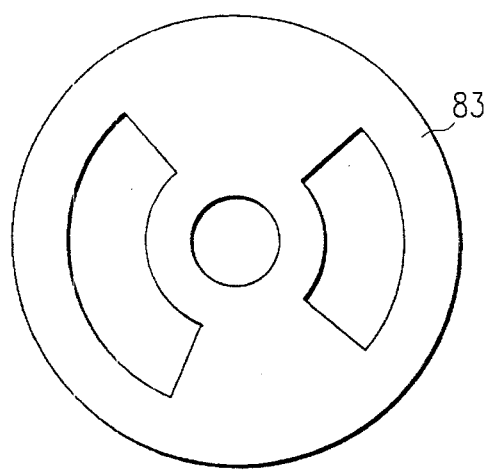
Figure 8C:
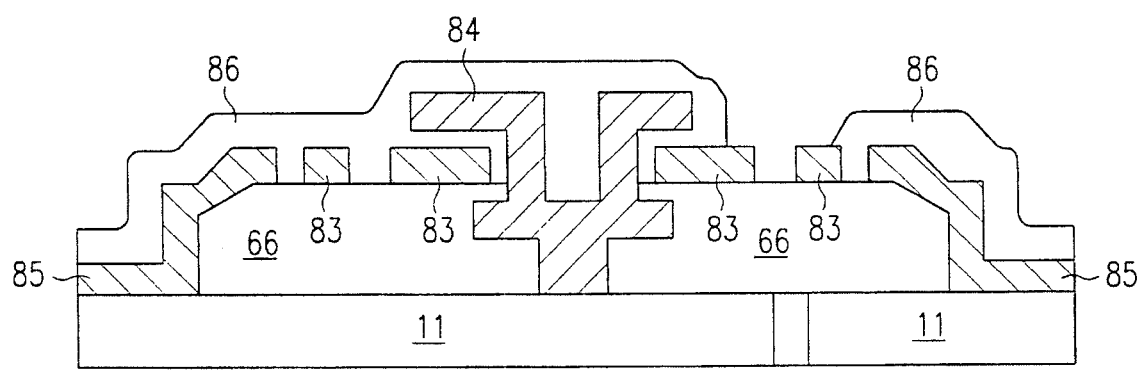
Figure 8D:
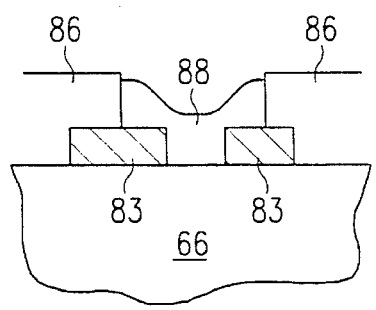
Figure 8E:
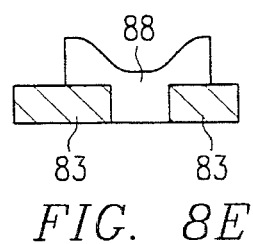

FIGS. 8A–8E illustrate additional steps in the fabrication process, for adding a filter over one opening of a rotor 83. These steps occur after rotor 83 has been formed, and may occur after hub 84 and stators 85 are formed. In the example of FIGS. 8A–8E, material has been deposited and etched to form hub 84 and stators 85, as well as rotor 83. All steps except a final cleanup to remove spacer material 66 have been performed. FIG. 8B is a top plan view of rotor 83 showing that it has two openings. In FIG. 8C, a layer of photoresist material 86 has been deposited over rotor 83, and has been etched to form an opening over one of the openings in rotor 83. In FIG. 8D, a filter material 88 has been deposited in the opening of the photoresist layer 86. The filter material 88 has properties such that it decreases the intensity or affects the color of light transmitted through it. In FIG. 8E, the photoresist layer 86 and the spacer layer 66 have been cleaned away, leaving a filter 88 over the opening.

Referring again to FIG. 8B, ideally filter 88 is formed over a larger of two openings in rotor 83. The relative sizes of the openings are designed so that the mass added by filter 88 will not substantially unbalance the rotation of rotor 83. The smaller size of the unfiltered opening adds mass to that opening.

A shutter 10 having a rotor 83 with a filter 88 over a first opening and an unfiltered second opening can be operated as a two state shutter, i.e, filtered or non filtered output. Or, it could be operated as a three state shutter, i.e., off, on, or filtered output.

Figure 9:
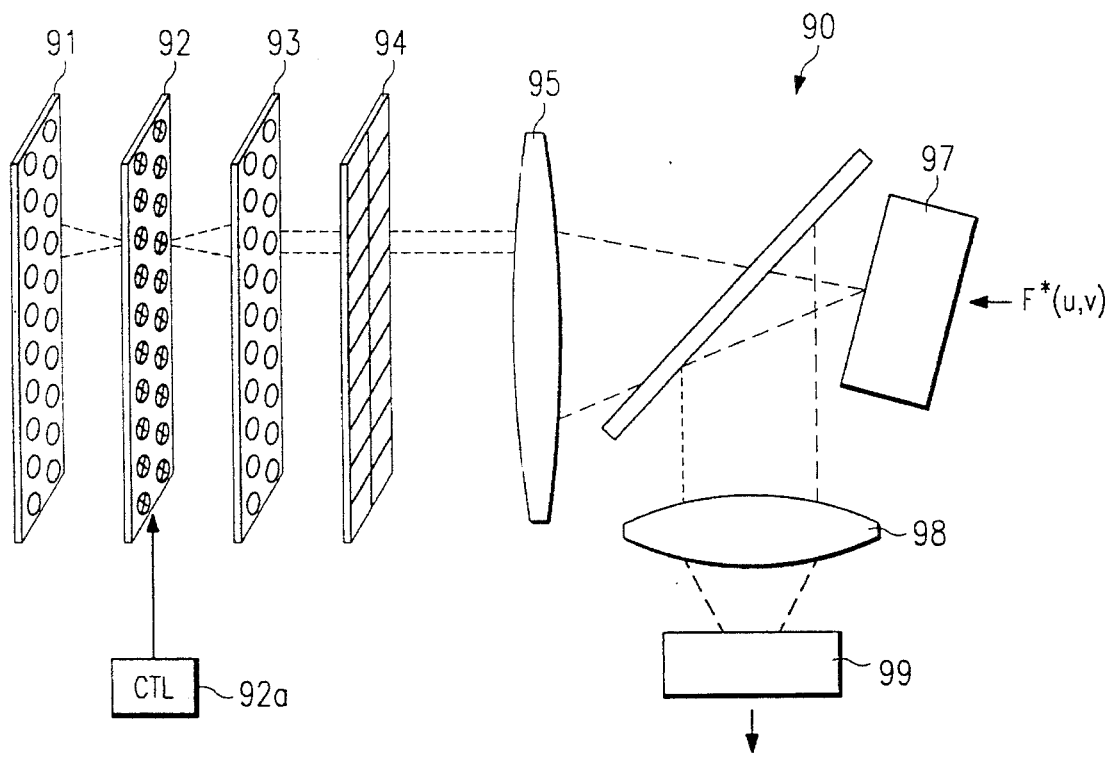
FIG. 9 illustrates an optical correlator that uses an array of optical shutters.

FIG. 9 illustrates an optical correlation system 90, which includes an array 92 of optical shutters 10 in accordance with the invention. In this application, array 92 provides a plurality of point sources of light, which can be selectively switched on and off. This switching permits a number of different reference views of an object to be compared to an acquired image. For example, in an object locating system, a number of reference views of the object from different azimuths and elevations could be compared with an image acquired by a surveillance aircraft. It has been experimentally determined that two views of the same object from angles 5 azimuthal degrees apart will correlate with reasonable accuracy. Thus, the reference images might comprise 72 (360/5) views of the object as seen from different angles on the ground, as well as elevational views if viewing might also be from above.

In accordance with this principle of operation, a first array of lenses 91 focuses light from a source (not shown) to the shutter array 92, each lens focussing light to each shutter. Preferably, the via 12 of each shutter 10 is cone-shaped, as described above in connection with FIG. 3B, so that the lenses of array 91 can focus light to the far opening of each via 12. Alternatively, instead of lens array 91, an optical fiber could be inserted into each via 12 of each shutter 10. Typically, these optical fibers would originate from a common light source.

The shutters of the array 92 are controlled by a control unit 92a so that a single shutter is open at one time. The light from the source is directed through that shutter and to a corresponding lens of a second lens array 93, which collimates the light. The collimated light passes through a corresponding reference image of the reference film 94.

The light that is transmitted through the reference image is scaled and Fourier transformed by transform lens 95. Meanwhile, a spatial light modulator 97 displays an image representing the complex conjugate of the Fourier transform of the acquired image, F*(u,v). The transformed reference image illuminates the face of the SLM 97. The result is that the total light reflected from SLM 97 is the product of the Fourier transform of the reference image and the complex conjugate of the Fourier transform of the acquired image.

This combined image is directed, via a beam splitter 96, to a second Fourier transform lens 98. The resulting image is incident on a sensor 99. The image data acquired from sensor 99 is processed to determine a correlation factor.

The use of a spatial light modulator, such as SLM 97, in an optical correlation system is described in U.S. Patent Ser. No. 937,987 (filed Nov. 2, 1992), entitled "Real Time Optical Correlation System", assigned to Texas Instruments Incorporated, which is incorporated herein by reference. That patent application further describes a phase-modulated image mays be displayed by an SLM, combined with another transformed image, with the combined image being reverse transformed and processed to obtain a correlation image.

In operation of correlation system 90, each shutter of array 92 is successively opened. A determination is made whether the corresponding image of reference film 94 matches the acquired image. This process continues until a match is found or until it is determined that there is no match.

Although the above example is in terms of a single reference image correlated with the acquired image, a more sophisticated correlation system could correlate more than one image at once. This capability is a function of processing bandwidth and power.

Figure 10:
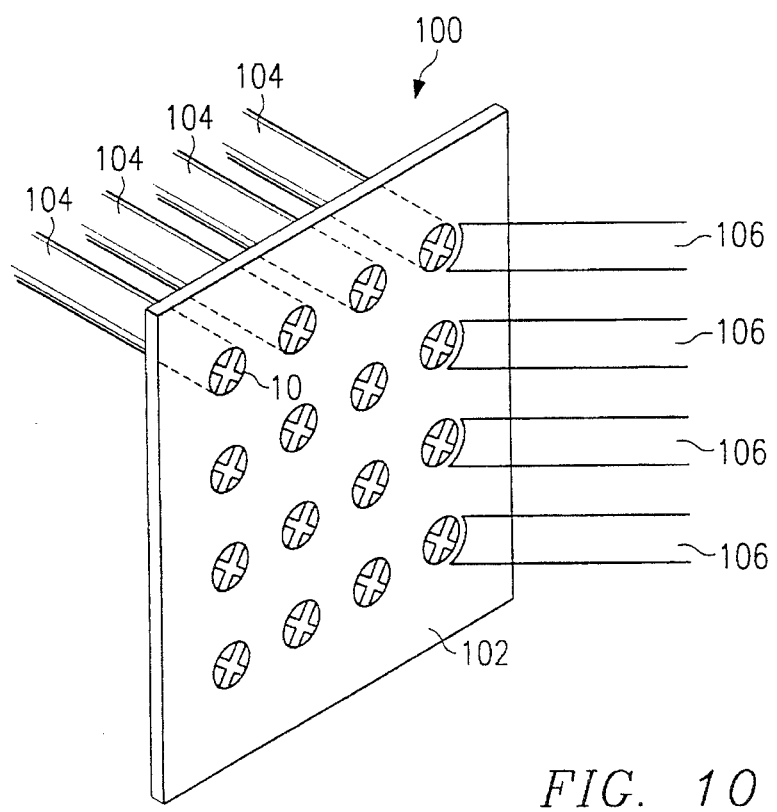
FIG. 10 illustrates an optical switch that uses an array of optical shutters.

FIG. 10 illustrates how an array 102 of optical shutters 10 can be used as an optical switch 100. Each shutter 10 has an input optical fiber 104 and an output optical fiber 106. For purposes of illustration, only one row of input fibers 104 and one column of output fibers 106 are shown. By controlling the timing of each shutter 10, light from an input fiber 102 can be turned on or off. The array can thus be used to communicate a code of data to output fibers 106.

The shutter array of FIG. 10 could also be used to direct light from one channel to another, such as with a crossbar switch. For a crossbar switch, each column of input fibers 104 could be from a single source channel, and each row of output fibers 106 could feed a single output channel. By operating the shutters 10, light from an input channel can be redirected to a desired output channel.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An array of micro-optical shutters, each for intermittently blocking the passage of radiation, comprising:

a substrate having a plurality of vias through which said radiation may pass, each via associated with a shutter;

each shutter comprising a rotor hub fabricated upon said substrate, a rotor fabricated above and spaced from said substrate for revolving around said rotor hub in a plane parallel to said substrate, said rotor having at least one opening that is aligned with at least one of said vias for a part of each revolution of said rotor, and a set of stator poles fabricated above said substrate around the perimeter of said rotor to which voltage may be applied for providing a rotor torque.

2. The array of claim 1, wherein each said rotor has a set of radial spokes.

3. The array of claim 1, wherein each said rotor is generally disk-shaped.

4. The array of claim 1, wherein each said rotor has a number of teeth around its perimeter.

5. The array of claim 1, wherein each said rotor is in the order of 100 microns in diameter.

6. The array of claim 1, wherein each said rotor has at least one filter for changing the wavelength of said light over said at least one opening.

7. The array of claim 1, wherein each said rotor has one or more dished portions of its underside.

8. The array of claim 1, wherein said vias are cylindrical in shape and of a size suitable for securing an optical fiber.

9. The array of claim 1, wherein said via are cone-shaped.

10. The array of claim 1, further comprising a control unit for controlling the timing of said voltage applied to said stator poles.

11. A method of manufacturing an array of micro-optical shutters, comprising the steps of:

etching vias through a substrate, each via associated with one of said shutters;

filling said vias with a sacrificial material;

sequentially depositing layers of etchable material on said substrate and etching rotors, rotor hubs, and stators from said etchable material, such that each rotor is rotatable around a rotor hub when voltage is applied to said stators, wherein each said rotor has at least one opening that may be aligned with an associated via during one revolution of said rotor; and removing said sacrificial material from vias.

12. The method of claim 11, further comprising the steps of depositing a filter material over said at least one opening.

13. The method of claim 11, wherein said substrate is silicon and said step of etching vias is performed with a orientation directed etch, such that said vias are cone-shaped.

14. The method of claim 11, wherein said step of etching vias is performed such that said vias are cylindrical in shape and have a diameter suitable for inserting an optical fiber.

15. The method of claim 11, further comprising the step of etching a dished portion on the underside of each said rotor.

16. An optical correlation system for comparing multiple reference images to one or more acquired image, comprising:

an array of micro-optical shutters fabricated on a substrate having a plurality of vias, each shutter comprising a rotor hub fabricated upon said substrate, a rotor fabricated above and spaced from said substrate for revolving around said rotor hub in a plane parallel to said substrate, said rotor having at least one opening that is aligned with one of said vias for a part of each revolution of said rotor, and a set of stator poles fabricated above said substrate around the perimeter of said rotor and substantially co-planar to said rotor, to which voltage may be applied for providing a rotor torque;

an array of lenses, each lens for receiving light transmitted through a via when a corresponding shutter is open;

a reference film having an array of reference images, each image associated with one of said shutters;

a first transform lens for receiving a reference image from said reference film and for transforming said image into its Fourier transform image;

a spatial light modulator having an array of reflective pixel elements, for displaying an image representing the complex conjugate of the Fourier transform of the acquired image and for reflecting said Fourier transform image of said reference image;

a second transform lens for receiving the combination of the image displayed by said spatial light modulator and the image reflected by said spatial light modulator, and for Fourier transforming the combined images; and a sensor for receiving the image transmitted by said second transform lens.

17. The optical correlation system of claim 16, wherein said vias are cylindrical in shape for inserting an optical fiber.

18. The optical correlation system of claim 16, wherein said vias are cone-shaped and further comprising an array of focussing lenses for focussing light from a source to each of said shutters.

* * * * *